United States Patent
Knuth

(10) Patent No.: US 8,484,954 B2
(45) Date of Patent: Jul. 16, 2013

(54) HIGH-EFFICIENCY SCR CATALYTIC CONVERTER

(75) Inventor: Hans Walter Knuth, Cologne (DE)

(73) Assignee: DEUTZ Aktiengesellschaft, Cologne (DE)

( * ) Notice: Subject to any disclaimer, the term of this patent is extended or adjusted under 35 U.S.C. 154(b) by 56 days.

(21) Appl. No.: 12/736,250

(22) PCT Filed: May 16, 2009

(86) PCT No.: PCT/EP2009/003500
§ 371 (c)(1),
(2), (4) Date: Sep. 23, 2010

(87) PCT Pub. No.: WO2009/146786
PCT Pub. Date: Dec. 10, 2009

(65) Prior Publication Data
US 2011/0011065 A1    Jan. 20, 2011

(30) Foreign Application Priority Data
May 30, 2008 (DE) .......................... 10 2008 026 178

(51) Int. Cl.
*F01N 3/20* (2006.01)

(52) U.S. Cl.
USPC ............... 60/295; 60/286; 60/299; 60/301

(58) Field of Classification Search
USPC .................. 60/286, 287, 295, 297, 299, 300, 60/301
See application file for complete search history.

(56) References Cited

U.S. PATENT DOCUMENTS

| 5,202,303 | A  | * | 4/1993  | Retallick et al. | 502/439 |
| 5,437,099 | A  | * | 8/1995  | Retallick et al. | 29/890  |
| 6,807,807 | B2 | * | 10/2004 | Kagenishi        | 60/288  |
| 6,877,313 | B1 | * | 4/2005  | Phillips et al.  | 60/297  |
| 7,063,642 | B1 | * | 6/2006  | Hu et al.        | 477/100 |
| 7,178,331 | B2 | * | 2/2007  | Blakeman et al.  | 60/301  |
| 7,204,082 | B1 | * | 4/2007  | MacBain et al.   | 60/286  |
| 7,418,816 | B2 | * | 9/2008  | Upadhyay et al.  | 60/285  |
| 7,562,522 | B2 | * | 7/2009  | Yan              | 60/286  |
| 7,712,307 | B2 |   | 5/2010  | Braun            | 60/297  |

(Continued)

FOREIGN PATENT DOCUMENTS

| DE | 1321641         | 12/1934 |
| DE | 10 2004 031 624 A1 | 2/2006 |

(Continued)

*Primary Examiner* — Kenneth Bomberg
*Assistant Examiner* — Dapinder Singh
(74) *Attorney, Agent, or Firm* — Davidson, Davidson & Kappel, LLC

(57) ABSTRACT

A method and a device for selectively purifying the exhaust gas of an internal combustion engine using a selective catalytic reduction (SCR) catalytic converter (2), wherein a reducing agent is metered to the exhaust gas prior to entry into the SCR catalytic converter (2). An overdose of the reducing agent is added to the exhaust gas, and the exhaust gas, after exiting the SCR catalytic converter, is fed in part through an oxidation catalytic converter (5) and in part to a second SCR catalytic converter (8) via a bypass (6) circumventing the oxidation catalytic converter. In the oxidation catalytic converter (5), one half of the excess NH3 flowing out of the first SCR catalytic converter (2) is converted to $NO_x$ and reacts to form non-hazardous nitrogen after mixing with the other half of the excess NH3 flowing unchanged through a bypass.

15 Claims, 1 Drawing Sheet

U.S. PATENT DOCUMENTS

| | | | |
|---|---|---|---|
| 7,862,640 B2 * | 1/2011 | Zhang et al. | 55/523 |
| 7,950,226 B2 * | 5/2011 | Mccarthy et al. | 60/301 |
| 8,137,648 B2 * | 3/2012 | Jen et al. | 423/210 |
| 8,166,751 B2 * | 5/2012 | Robel | 60/297 |
| 8,171,721 B2 * | 5/2012 | Boddy et al. | 60/286 |
| 8,209,960 B2 * | 7/2012 | Shamis et al. | 60/286 |
| 2006/0000202 A1 | 1/2006 | Ripper et al. | 60/286 |
| 2006/0185352 A1 * | 8/2006 | Twigg | 60/297 |
| 2006/0254258 A1 * | 11/2006 | Blakeman et al. | 60/286 |
| 2007/0012032 A1 | 1/2007 | Hu | 60/286 |
| 2007/0082783 A1 * | 4/2007 | Hu et al. | 477/100 |
| 2008/0008629 A1 | 1/2008 | Doring et al. | 422/171 |
| 2008/0120966 A1 * | 5/2008 | Sugiyama et al. | 60/287 |
| 2009/0241514 A1 * | 10/2009 | Gernsbeck et al. | 60/275 |
| 2009/0257924 A1 * | 10/2009 | Dismon et al. | 422/174 |
| 2010/0126148 A1 * | 5/2010 | Morishima et al. | 60/287 |
| 2010/0139250 A1 * | 6/2010 | Andersson et al. | 60/285 |

FOREIGN PATENT DOCUMENTS

| | | | |
|---|---|---|---|
| DE | 10 2004 036 036 | | 3/2006 |
| DE | 10 2005 035555 | | 2/2007 |
| DE | 102006004170 | * | 8/2007 |
| DK | 2006207512 | | 8/2006 |
| EP | 0 924 400 A | | 6/1999 |
| EP | 1 882 832 A | | 1/2008 |

* cited by examiner

HIGH-EFFICIENCY SCR CATALYTIC CONVERTER

The invention relates to a method for selectively purifying the exhaust gas of an internal combustion engine using an SCR(SCR=selective catalytic reduction) converter in which a metered amount of a reducing agent is admixed to the exhaust gas before entering the SCR converter, and the invention also relates to a device for carrying out the method.

BACKGROUND

Such a method and a corresponding device are disclosed in German patent application DE 10 2004 031 624 A1. In particular, this method and this device make it possible to control or regulate the level of reagent in the catalytic converter at a prescribed target storage value. On the one hand, the targeted specification of the target storage value ensures that, during non-stationary states of the internal combustion engine, a sufficient amount of reagent is available to eliminate at least one undesired exhaust gas component as completely as possible, and, on the other hand, that reagent leakage is avoided.

SUMMARY OF THE INVENTION

It is an object of the present invention to provide a method and a device with which highly efficient nitrogen oxide removal can be achieved.

The present invention provides a method in which an overdose of the reducing agent is admixed to the exhaust gas and in that, after the exhaust gas has left the SCR converter, it is fed partially through an oxidation catalyst and partially to a second SCR converter via a bypass that circumvents the oxidation catalyst. The present invention also provides a device is characterized in that, downstream from the SCR converter, there is an oxidation catalyst as well as a bypass that circumvents the oxidation catalyst and that is followed by a second SCR converter. Once the exhaust gas—which contains hardly any $NO_x$ but rather only $NH_3$—has left the SCR converter, about half of the exhaust gas is passed over an oxidation catalyst, where the $NH_3$ is oxidized into $NO_x$. The remaining half of the exhaust gas is fed via a bypass (the $NH_3$ remains unchanged). Subsequently, the two exhaust gas streams are reunited (approximately 50% $NO_x$ and approximately 50% $NH_3$). This exhaust gas stream is fed to the second SCR converter and the $NH_3$ and $NO_x$ react with each other virtually completely, forming nitrogen and water ($NO+NO_2+2NH_3 \rightarrow 2N_2+3H_2O$).

Therefore, this system attains a much higher efficiency level of nitrogen oxide removal.

In this context, the technical regulation resources needed for metering the reducing agent are considerably less than with conventional SCR systems since all that is necessary is to ensure a certain overdosing of the reducing agent upstream from the first SCR converter. The precise amount of the overdose, however, is not so crucial because the reducing agent in the components installed downstream is fundamentally always converted exactly 100% into non-hazardous nitrogen. Furthermore, there is no longer a need for regulation of this downstream arrangement since the function results exclusively from the components themselves.

In order for precisely 50% of the exhaust gas to flow over the oxidation catalyst, a catalytic substrate could likewise be installed in the bypass, but without an active catalytic coating. As an alternative, the flow in the bypass can be throttled in a different manner.

The same function can also be attained with a different arrangement of the components. The oxidation catalyst is catalytically coated in a portion of the segments while other segments are not coated (this portion then functions as the bypass). Downstream from this, there is a mixer, for example, in the form of a metal foam or ceramic foam. The advantage of this configuration is that all of the components can be manufactured with a uniform diameter, as a consequence of which they can be integrated into a shared housing.

The more finely the catalytically coated segments and the uncoated segments are structured, the less effort is needed for the downstream mixer. In this context, the finest conceivable structuring is present when the channels of the monolith that forms the oxidation catalyst are configured so as to be coated and uncoated alternatingly. In this case, the downstream mixer can be completely dispensed with. A small gap between the oxidation catalyst and the second SCR converter will then be sufficient for the mixing process.

Since the $NO_x$ conversion at the second SCR converter is considerably less than at the first SCR converter, a considerably smaller volume will be sufficient. Since the volumes of the oxidation catalyst and of the mixer can be kept relatively small, the volume of the described overall system can be kept to a reasonable size.

During the fine-tuning of the described system, it was found that, owing to other chemical reactions that have not been presented so far and owing to incomplete reactions, the optimal value for the stream division is not precisely 50%, but rather another value, when it comes to minimizing $NO_x$ emissions and ammonia leakage. Such a stream division value that diverges from 50% is likewise the subject matter of the described invention. A competing oxidization of $NH_3$ into $NO_x$ is, for example, the oxidation of $NH_3$ into nitrogen ($N_2$). This is the reaction that should preferably take place on an ammonia trap catalyst. The oxidation effect of an ammonia trap catalyst is slowed down, as a consequence of which the $NO_2$ tends to oxidize to form $N_2$. The oxidation effect of the oxidation catalyst employed in the system described here must not be slowed down, but rather, must have a particularly high oxidation effect in order to oxidize all of the $NH_3$ that flows through the oxidation catalyst to form $NO_x$. The more complete this reaction, the more efficiently the described method works. In the case of reaction processes that are not ideal (for instance, the formation of a certain fraction of $N_2$ during the $NH_3$ oxidation), it can be necessary to use a stream division value that diverges from 50% in order to attain an optimal total efficiency.

When a 100% $No_x$ reduction is achieved with an overdose of 20% in the first SCR converter and with an efficiency of 80% in the second SCR converter, the calculated total efficiency is 96%. With an overdose of 10% and an efficiency of 90% in the second SCR stage, the calculated total efficiency is 99%.

An SCR converter having such a high efficiency provides engine designers with considerable freedom when working towards meeting stringent emission requirements such as, for example, the Euro VI for utility vehicle engines and Tier IV for industrial engines, since low $NO_x$ limit values can already be attained with just the catalytic converter, and the engine can then be optimized considerably more effectively on the basis of other criteria, such as, for example, consumption or soot emission. An engine that has been optimized in terms of its consumption would save fuel resources and reduce greenhouse-gas emissions.

In the case of the dynamic operation of internal combustion engines, in which the $NO_x$ concentrations upstream from the SCR converter and (certainly) also the $NH_3$ concentrations downstream from the first SCR converter change very quickly, the retention times of the reactants in the oxidation catalyst and in the bypass have to be the same to the greatest extent possible, so that the correct approximately 50/50 division is retained at every point in time. Since flow, adsorption and storage effects play a role when it comes to the retention times, the magnitude of all three of these effects in the oxidation catalyst and in the bypass has to be the same to the greatest extent possible. For this purpose, the bypass material has to be provided with the same washcoat as the oxidation catalyst, the only difference being the absence of a noble-metal coating in the bypass material.

The $NH_3$ storage capacity of the first SCR converter should be as small as possible, so that, even during a dynamic engine operation, sufficient ammonia leakage can be achieved at all times.

BRIEF DESCRIPTION OF THE DRAWINGS

Additional advantageous embodiments can be gleaned from the description of the drawings below, in which embodiments of the invention presented in the figures are described in greater detail. The following is shown.

DETAILED DESCRIPTION

Figure 1:
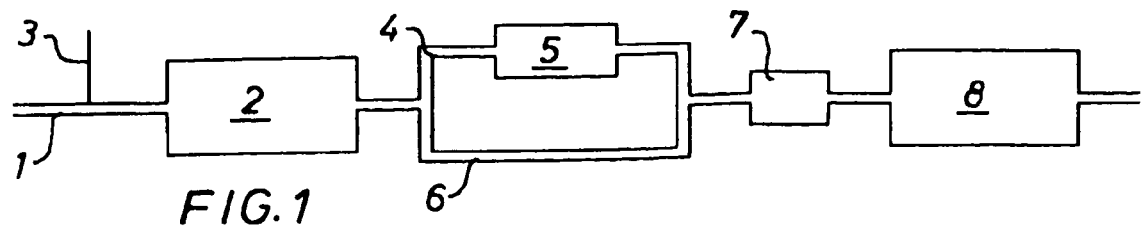
FIG. 1—a schematic view of an arrangement of the individual components.
Figure 2:
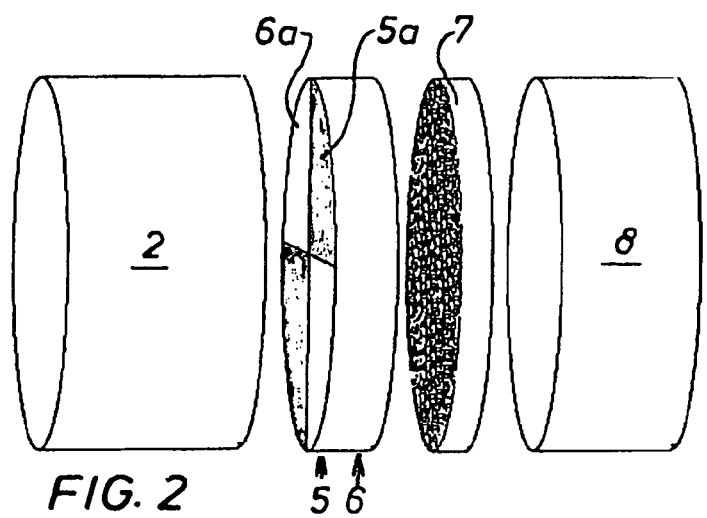
FIG. 2—a first configuration of the combined components.
Figure 3:
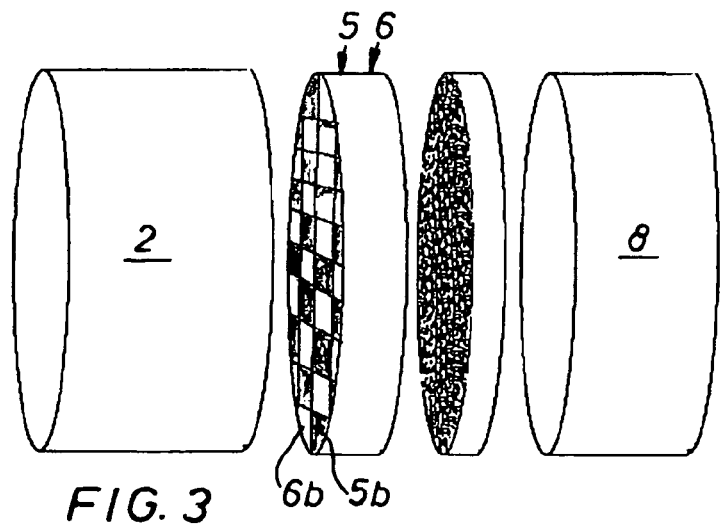
FIG. 3—a second configuration of the combined components.

The exhaust gas, especially of a self-igniting internal combustion engine, is fed via a first exhaust gas line 1 into a first SCR converter 2, a process in which a reducing agent 3 is metered into the first exhaust gas line 1 via a suitable feed line 3. The exhaust gas flows through the first SCR converter 2 and then reaches an oxidation catalyst 5 via another exhaust gas line 4. The oxidation catalyst 5 has a bypass 6 that can be configured as depicted in FIGS. 2 and 3, or else it can fundamentally be a bypass line which has a throttle valve or a shut-off valve (not shown here). In this manner, the amount of exhaust gas that passes through the oxidation catalyst 5 and through the bypass line can be established. The exhaust gas streams are reunited upstream from the oxidation catalyst 5 and fed to a mixer 7. In the mixer 7, the exhaust gas streams are mixed together and subsequently, at the mixer 7, they are fed to a second SCR converter 8, which discharges the purified exhaust gas into the environment.

FIG. 2 shows a first configuration of the combined essential components. Here, the first SCR converter 2, together with the oxidation catalyst 5, the bypass 6, the mixer 7 and the second SCR converter 8 are fundamentally combined to form a single cylindrical modular unit that is shown in the drawing broken down into the individual components only so that they can be clearly depicted. In this context, the oxidation catalyst 5 is catalytically coated in some of the segments 5a and left uncoated in the other segments 6a. Accordingly, the coated segments 5a function as an oxidation catalyst 5 and the uncoated segments as the bypass 6. The mixer 7 is depicted as a disk consisting of a metal or ceramic foam.

Diverging from this, in the embodiment shown in FIG. 3, the catalytically coated segments 5a and the uncoated segments 6b have a finer structure. This entails the advantage that fewer requirements are made of the configuration of the mixer 7. Optionally, it is even possible to dispense with the mixer 7.

Reference Numerals
1 exhaust gas line
2 first SCR converter
3 feed line
4 exhaust gas line
5 oxidation catalyst
6 bypass
7 mixer
8 second SCR converter

The invention claimed is:

1. A method for selectively purifying exhaust gas of an internal combustion engine having an SCR converter, comprising:
   admixing a metered amount of a reducing agent to the exhaust gas before entering the SCR converter in an overdose; and
   after the exhaust gas has left the SCR converter, feeding the exhaust gas partially through an oxidation catalyst and partially through a bypass circumventing the oxidation catalyst, and feeding the exhaust gas to a second SCR converter downstream of the bypass and the oxidation catalyst.

2. The method as recited in claim 1 wherein the feeding including establishing an approximately 50/50 stream flow through the oxidation catalyst and the bypass.

3. The method as recited in claim 1 wherein the exhaust gas is passed through a mixer before entering the second SCR converter.

4. A device for selectively purifying the exhaust gas of an internal combustion engine comprising:
   an SCR converter in which a metered amount of a reducing agent is admixed to the exhaust gas before entering the SCR converter;
   an oxidation catalyst downstream from the SCR converter;
   a bypass downstream from the SCR converter and circumventing the oxidation catalyst; and
   a second SCR converter downstream from the bypass.

5. The device as recited in claim 4 further comprising a mixer upstream from the second SCR converter.

6. The device as recited in claim 5 wherein the SCR converter, the oxidation catalyst, the bypass, the mixer and the second SCR converter form a single modular unit.

7. The device as recited in claim 6 wherein the modular unit is a cylindrical body having a constant diameter.

8. The device as recited in claim 6 wherein oxidation catalyst is made up of catalytically active segments and of catalytically non-active segments.

9. The method as recited in claim 1 wherein the exhaust gas fed through the oxidation catalyst includes $NH_3$ and the oxidation catalyst oxidizes the $NH_3$.

10. The method as recited in claim 9 wherein the exhaust gas fed through the bypass includes $NH_3$ that remains unchanged.

11. The method as recited in claim 10 wherein exhaust gas fed through the oxidation catalyst and the exhaust gas fed through the bypass are reunited upstream of the second SCR converter to form a reunited stream including approximately 50% $NO_x$ and approximately 50% $NH_3$.

12. The method as recited in claim 11 wherein $NH_3$ and $NO_x$ in the reunited stream react with each other at the second SCR converter and form nitrogen and water.

13. The method as recited in claim 1 wherein the SCR converter and the second SCR coverter convert $NO_x$.

14. The device as recited in claim 4 wherein the SCR converter and the second SCR converter are configured to convert $NO_x$.

15. The device as recited in claim 4 wherein the oxidation catalyst oxidizes $NH_3$.

* * * * *